(12) United States Patent
Higley et al.

(10) Patent No.: US 11,115,778 B2
(45) Date of Patent: Sep. 7, 2021

(54) METHOD TO CONFIGURE USER POSITIONING INFORMATION SHARING

(71) Applicant: Carrier Corporation, Palm Beach Gardens, FL (US)

(72) Inventors: Jason Higley, Pittsford, NY (US); Wilmann Gomez, New Britain, CT (US); Dang Nguyen, Alpharetta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/635,675

(22) PCT Filed: Aug. 14, 2018

(86) PCT No.: PCT/US2018/046633
§ 371 (c)(1),
(2) Date: Jan. 31, 2020

(87) PCT Pub. No.: WO2019/036429
PCT Pub. Date: Feb. 21, 2019

(65) Prior Publication Data
US 2021/0127227 A1    Apr. 29, 2021

Related U.S. Application Data

(60) Provisional application No. 62/547,613, filed on Aug. 18, 2017.

(51) Int. Cl.
| | |
|---|---|
| *H04W 4/02* | (2018.01) |
| *H04W 4/029* | (2018.01) |
| *H04W 24/08* | (2009.01) |
| *H04W 92/18* | (2009.01) |

(52) U.S. Cl.
CPC .......... *H04W 4/023* (2013.01); *H04W 4/029* (2018.02); *H04W 24/08* (2013.01); *H04W 92/18* (2013.01)

(58) Field of Classification Search
None
See application file for complete search history.

(56) References Cited

FOREIGN PATENT DOCUMENTS

| | | | | |
|---|---|---|---|---|
| EP | 2443810 B1 | * | 12/2016 | ........... H04L 63/107 |
| WO | 2010148214 A2 | | 12/2010 | |

OTHER PUBLICATIONS

Notification of Transmittal of the International Search Report for International Application No. PCT/US2018/046633; Report dated Nov. 13, 2018; Report Received Date: Nov. 22, 2018; 5 pages.
Written Opinion the International Searching Authority for International Application No. PCT/US2018/046633; Report dated Nov. 13, 2018; Report Received Date: Nov. 22, 2018; 9 pages.

* cited by examiner

*Primary Examiner* — Adolf Dsouza
(74) *Attorney, Agent, or Firm* — Cantor Colburn LLP

(57) ABSTRACT

A method is of monitoring a user is provided. The method comprising: receiving a position request from a first user device, the position request requesting visibility to a current position of a second user device; requesting a granularity level of the second user device in relation to the first user device; receiving the granularity level when the granularity level is established; determining a current position of the second user device; determining a mapped position in response to the granularity level and the current position; and transmitting the mapped position to the first user device.

17 Claims, 2 Drawing Sheets

METHOD TO CONFIGURE USER POSITIONING INFORMATION SHARING

CROSS-REFERENCE TO RELATED APPLICATIONS

Figure 1:
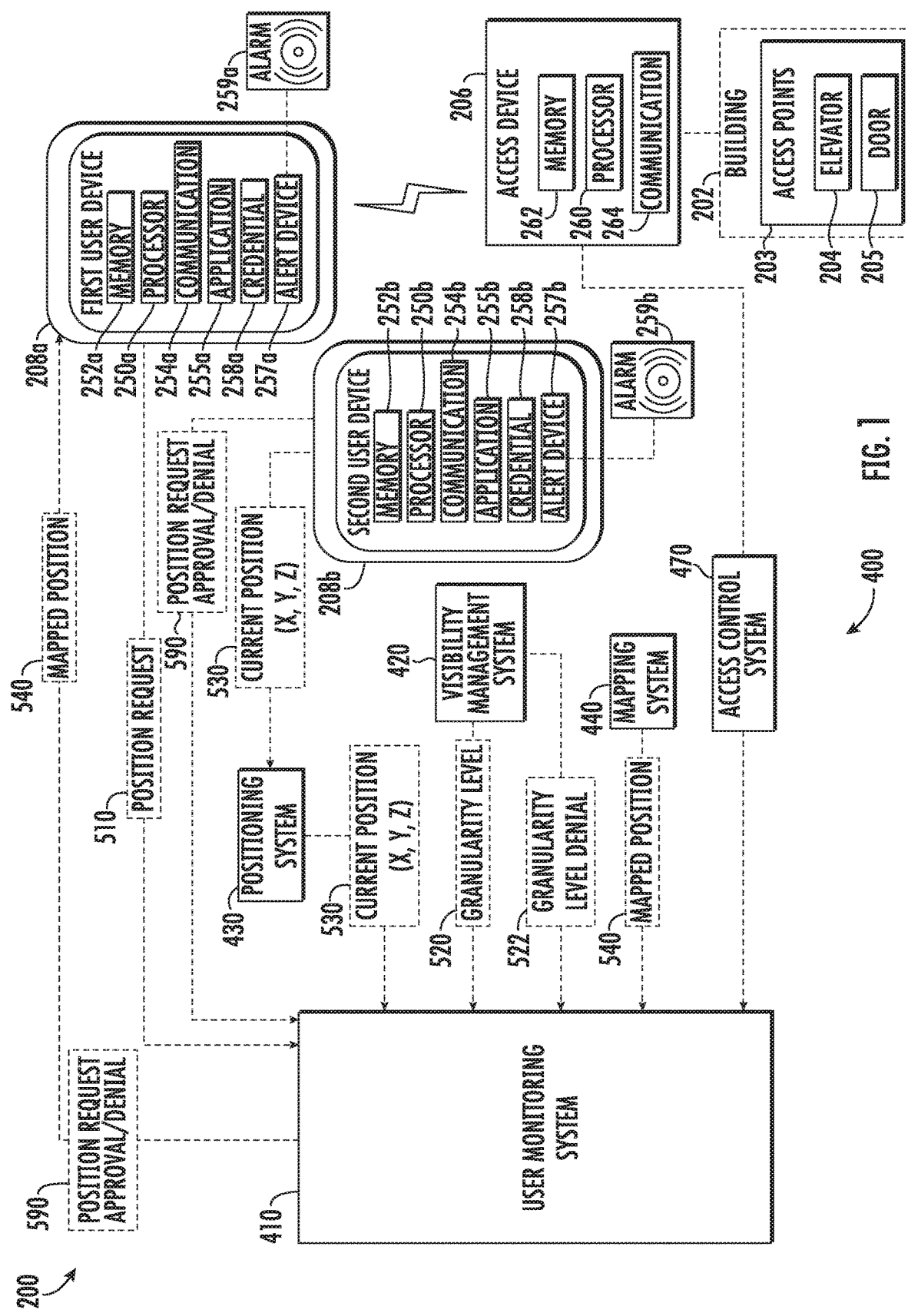

This application is based on International Application No. PCT/US2018/046633 filed Aug. 14, 2018, which claims priority to U.S. Provisional Patent Application Ser. No. 62/547,613 filed Aug. 18, 2017, both of which are incorporated herein by reference in their entirety.

BACKGROUND

The subject matter disclosed herein generally relates to the field of monitoring a person, and more particularly to an apparatus and method a location of person on a variable granularity.

Existing monitoring systems grant visibility to users to see the location of a person but allow few options to control the visibility between users.

BRIEF SUMMARY

According to one embodiment, a method is of monitoring a user is provided. The method comprising: receiving a position request from a first user device, the position request requesting visibility to a current position of a second user device; requesting a granularity level of the second user device in relation to the first user device; receiving the granularity level when the granularity level is established; determining a current position of the second user device; determining a mapped position in response to the granularity level and the current position; and transmitting the mapped position to the first user device.

In addition to one or more of the features described above, or as an alternative, further embodiments may include: activating an alarm on the first user device when the mapped position is received.

In addition to one or more of the features described above, or as an alternative, further embodiments may include that prior to the receiving the granularity level when the granularity level is established, the method further comprises: receiving a granularity denial; transmitting the position request to the second user device; receiving an approval from the second user device; and establishing the granularity level.

In addition to one or more of the features described above, or as an alternative, further embodiments may include: activating an alarm on the second user device when the position request is received.

In addition to one or more of the features described above, or as an alternative, further embodiments may include that establishing further comprises: receiving the granularity level from the second user device.

In addition to one or more of the features described above, or as an alternative, further embodiments may include that establishing further comprises: determining the granularity in response to a relationship between the first user device and the second user device.

In addition to one or more of the features described above, or as an alternative, further embodiments may include: displaying the mapped position on the first user device.

According to another embodiment, a user monitoring system is provided. The user monitoring system comprising: a processor; and a memory comprising computer-executable instructions that, when executed by the processor, cause the processor to perform operations, the operations comprising: receiving a position request from a first user device, the position request requesting visibility to a current position of a second user device; requesting a granularity level of the second user device in relation to the first user device; receiving the granularity level when the granularity level is established; determining a current position of the second user device; determining a mapped position in response to the granularity level and the current position; and transmitting the mapped position to the first user device.

In addition to one or more of the features described above, or as an alternative, further embodiments may include that the operations further comprise: activating an alarm on the first user device when the mapped position is received.

In addition to one or more of the features described above, or as an alternative, further embodiments may include that prior to the receiving the granularity level when the granularity level is established, the operations further comprises: receiving a granularity denial; transmitting the position request to the second user device; receiving an approval from the second user device; and establishing the granularity level.

In addition to one or more of the features described above, or as an alternative, further embodiments may include that the operations further comprise: activating an alarm on the second user device when the position request is received.

In addition to one or more of the features described above, or as an alternative, further embodiments may include that the establishing further comprises: receiving the granularity level from the second user device.

In addition to one or more of the features described above, or as an alternative, further embodiments may include that the establishing further comprises: determining the granularity in response to a relationship between the first user device and the second user device.

In addition to one or more of the features described above, or as an alternative, further embodiments may include that the operations further comprise: displaying the mapped position on the first user device.

According to another embodiment, a computer program product tangibly embodied on a computer readable storage medium is provided. The computer program product including instructions that, when executed by a processor, cause the processor to perform operations comprising: receiving a position request from a first user device, the position request requesting visibility to a current position of a second user device; requesting a granularity level of the second user device in relation to the first user device; receiving the granularity level when the granularity level is established; determining a current position of the second user device; determining a mapped position in response to the granularity level and the current position; and transmitting the mapped position to the first user device.

In addition to one or more of the features described above, or as an alternative, further embodiments may include that the operations further comprise: activating an alarm on the first user device when the mapped position is received.

In addition to one or more of the features described above, or as an alternative, further embodiments may include that prior to the receiving the granularity level when the granularity level is established, the operations further comprises: receiving a granularity denial; transmitting the position request to the second user device; receiving an approval from the second user device; and establishing the granularity level.

In addition to one or more of the features described above, or as an alternative, further embodiments may include that the operations further comprise: activating an alarm on the second user device when the position request is received.

In addition to one or more of the features described above, or as an alternative, further embodiments may include that the establishing further comprises: receiving the granularity level from the second user device.

In addition to one or more of the features described above, or as an alternative, further embodiments may include that the establishing further comprises: determining the granularity in response to a relationship between the first user device and the second user device.

In addition to one or more of the features described above, or as an alternative, further embodiments may include that the operations further comprise: displaying the mapped position on the first user device.

Technical effects of embodiments of the present disclosure include enabling users to monitor a current position of other users at variable granularities.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
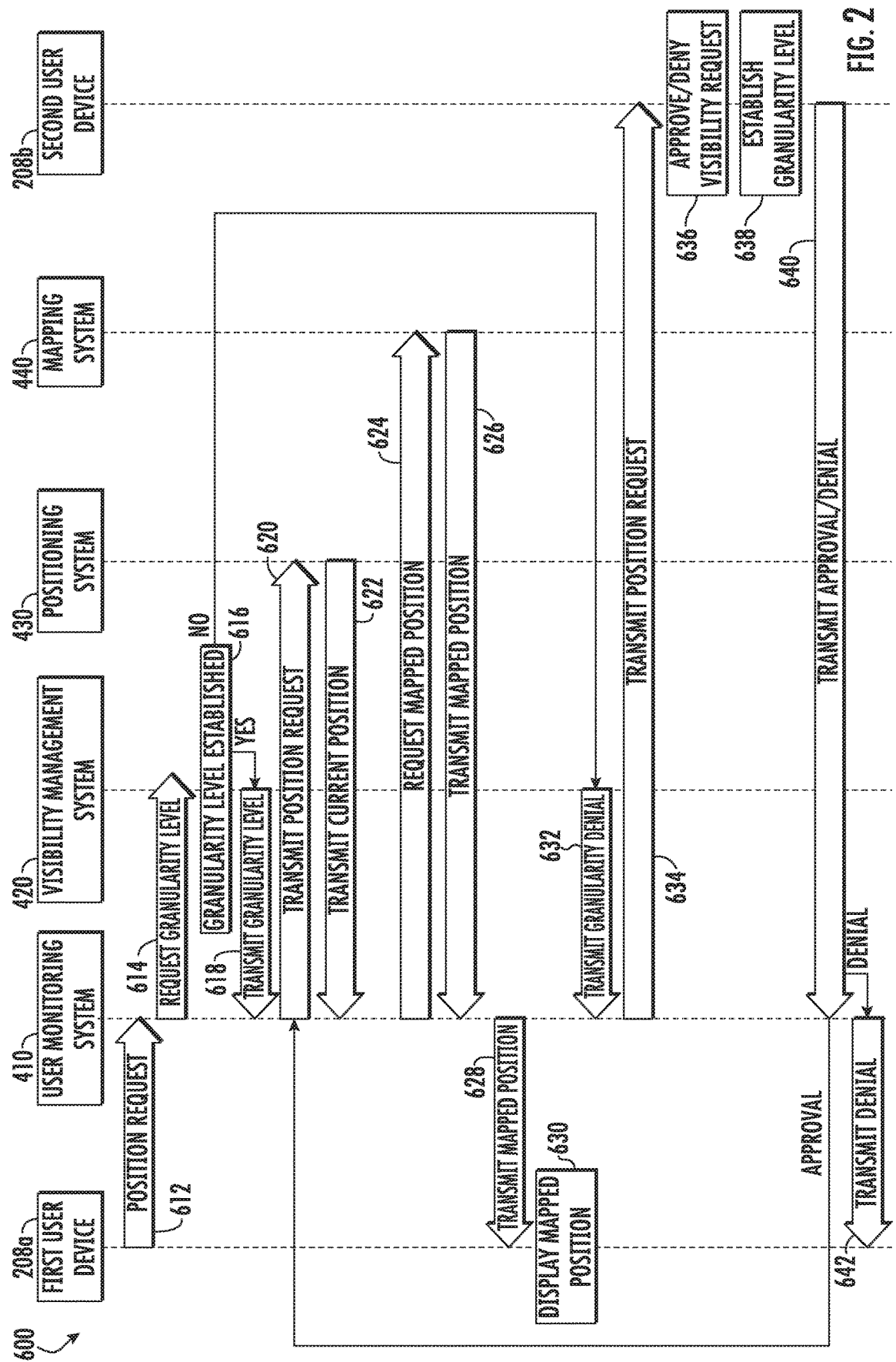

The following descriptions should not be considered limiting in any way. With reference to the accompanying drawings, like elements are numbered alike:

FIG. 1 illustrates a schematic view of a user monitoring system, in accordance with an embodiment of the disclosure; and FIG. 2 is a flow diagram illustrating a method of monitoring a user, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 depicts a system 200 in an example embodiment. The system 200 includes a first user device 208a and a second user device 208b. The first user device 208a and the second user device 208b are capable of secure bi-directional communication with an access device 206, a plurality of interconnected systems 400, and each other.

The first user device 208a may be a computing device such as a desktop computer. The first user device 208a may also be a mobile computing device that is typically carried by a person, such as, for example a phone, PDA, smart watch, tablet, laptop, etc. The first user device 208a may also be two separate devices that are synced together such as, for example, a cellular phone and a desktop computer synced over an internet connection. The first user device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the first user device 208a including executable instructions stored therein, for instance, as firmware. The communication module 254a may implement one or more communication protocols as described in further detail herein. The first user device 208a is configured to store a unique credential 258a that may be shared with the access device 206 and a plurality of interconnected systems 400, discussed further below. In a non-limiting example, the first user device 208a may belong to an employee and/or resident of a building 202. The first user device 208a may include an alert device 257a configured to activate an alarm 259a. In three non-limiting examples, the alert device 257a may be a vibration motor, audio speaker, and/or display screen. The alarm 259a may be audible, visual, haptic, and/or vibratory. The first user device 208a may also include an application 255a. Embodiments disclosed herein, may operate through the application 255a installed on the first user device 208a.

The second user device 208b may be a computing device such as a desktop computer. The second user device 208b may also be a mobile computing device that is typically carried by a person, such as, for example a phone, PDA, smart watch, tablet, laptop, etc. The second user device 208b may also be two separate devices that are synced together such as, for example, a cellular phone and a desktop computer synced over an internet connection. The second user device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the second user device 208b including executable instructions stored therein, for instance, as firmware. The communication module 254b may implement one or more communication protocols as described in further detail herein. The second user device 208b is configured to store a unique credential 258b that may be shared with the access device 206 and a plurality of interconnected systems 400, discussed further below. In a non-limiting example, the second user device 208b may belong to an employee and/or resident of the building 202. The second user device 208b may include an alert device 257b configured to activate an alarm 259b. In three non-limiting examples, the alert device 257b may be a vibration motor, audio speaker, and/or display screen. The alarm 259b may be audible, visual, haptic, and/or vibratory. The second user device 208b may also include an application 255b. Embodiments disclosed herein, may operate through the application 255b installed on the second user device 208b.

As shown in FIG. 1, the system 200 also includes a plurality of interconnected systems 400 including: a positioning system 430, a visibility management system 420, a mapping system 440, an access control system 470, and a user monitoring system 410. In the illustration of FIG. 1, the interconnected systems 400 are illustrated as separate systems. In an embodiment, at least one of the positioning system 430, the visibility management system 420, the mapping system 440, the access control system 470, and the user monitoring system 410 may be combined into a single system. In another embodiment, at least one of the positioning system 430, the visibility management system 420, the mapping system 420, the access control system 470, and the user monitoring system 410 is within the first user device 208a. In another embodiment, at least one of the positioning system 430, the visibility management system 420, the mapping system 440, the access control system 470, and the user monitoring system 410 is within the second user device 208b.

The interconnected systems 400 may each include a processor, memory, and communication module. For ease of illustration, the processor, memory, and communication module are not shown in FIG. 1. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware. The communication module may implement one or more communication protocols as described in further detail herein.

The positioning system 430 is configured to determine the current position 530 of the second user devices 208b. The current position 530 includes the (x, y, z) coordinates of the second user devices 208b on a map. The (x, y, z) coordinates may translate to a latitude, a longitude, and an elevation. The positioning system 430 may use various methods in order to determine the current position 530 such as, for example, GPS, Bluetooth triangulation, Wi-Fi triangulation, cellular signal triangulation, or any other location determination method known to one of skill in the art. The positioning system 430 is configured to transmit the current position 530 to the user monitoring system 410. The user monitoring system 410 is configured to receive the current position 530 from the positioning system 430 and may store each current position 530 received.

The user monitoring system 410 is configured to receive a position request 510 from a first user device 208a. The position request 510 is a request to see a current position 530 of the second user device 208b. The second user device 208b may approve/deny the position request 510 through an approval/denial 590, which may be an approval 590 or a denial 590 of the position request 510. The user monitoring system 410 is configured transmit the position request 510 to the visibility management system 420 to obtain a granularity level 520. The visibility management system 420 stores and maintains the granularity level 520 for visibility of the second user device 208b by the first user device 208a. The granularity level 520 is the granularity that the first user device 208a may see the current position 530 of the second user device 208b. For example, the granularity level 520 may allow a user of the first user device 208a to see a mapped position 540 of the second user device. If a granularity level is not availability for visibility of the second user device 208b by the first user device 208a a granularity denial 522 is transmitted from the visibility management system 420 to the user monitoring system 410.

The mapping system 440 is configured to determine the mapped position 540 in response to the granularity level 520 and the current position 530 of the second user device 208b. The mapped position 440 may be the current position 530 of the second user device 208b or the current position 530 at a different granularity level 520, such as for example, a desk within a building 202, a room within a building 202, a section of a building, a lobby of a building, a floor of the building, an elevator 204 of the building, a building 202, an area outside a building 202, a parking lot, a city block, a city, a state/province, region, a country . . . etc. The granularity level 520 increases as the breadth of the mapped position 540 decreases and decreases as the breadth of the mapped position 540 increases.

The system 200 includes at least one access device 206 to grant/deny access to access points 203, such as for example an elevator 204 or a door 205. The access device 206 grants/denies access to access points 203 by adjusting the access point 203, such as, for example, unlocking a door lock or opening an elevator door. The access points 203 may be installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator 204. Persons entering the building 202 may be required to enter a door 205. In another non-limiting embodiment, the door 205 may be outside of a building, such as, for example a car door. The door 205 may include but is not limited to a door in a wall of the building 202, a door on the outside of the building 202, a garage door, a parking lot access gate, a turnstile, a car door, or similar access point known to one of skill in the art.

The access points 203 may be operably connected to one or more access devices 206. The access device 206 may be configured to control access to the access points 203, such as, for example an elevator 204 and a door 205. Although only one elevator 204 is shown in FIG. 1, it is understood that any number of elevators 204 may be used in the system 200. It is understood that other components of the elevator 204 (e.g., elevator car, doors, drive, counterweight, safeties, etc.) are not depicted for ease of illustration. It is also understood that each elevator 204 may utilize one or more access devices 206. In an example, there may be an access device 206 located on each floor of the building 202 located proximate an elevator shaft. Further, although only one door 205 is shown in FIG. 1, it is understood that any number of doors 205 may be used in the system 200. It is understood that other components of doors 205 are not depicted for ease of illustration (e.g., locks). It is also understood that each door 205 may utilize one or more access devices 206.

In a non-limiting example, the access device 206 may be a door reader or door strike. The access device 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The memory 262 may store a unique device ID for each access device 206. The memory 262 may also store a set of geo-location information for each access device 206. The first user device 208a and the second user device 208b may actuate an access device 206 when within a selected range of the access device 206. The communication module 264 allows for secure bi-directional communication wirelessly with the first user device 208a and the second user device 208b. The communication module 264 may implement one or more communication protocols as described in further detail herein. Communication with the first user device 208a and the second user device 208b may aid in the positioning system 430 determining a current position 530 of the second user device 208b. For example, the second user device 208b may have just been used to unlock an access device 206 on a door 205 to a secure location, thus the positing system 430 may determine that the user of the second user device 208b may be in the secure room.

The first user device 208 and the second user device 208b communicate with the access device 206, the interconnected systems 400, and with each other. The communication may occur over a wireless network, such as 802.11x (Wi-Fi), short-range radio (Bluetooth), cellular, satellite, etc. In some embodiments, an interconnected system 400 and the access device 206 may include, or be associated with (e.g., communicatively coupled to) a networked system, such as kiosk, beacon, lantern, bridge, router, network node, building intercom system, etc. The networked system may communicate with the first user device 208 and the second user device 208b using one or more communication protocols or standards. For example, the networked system may communicate with the first user device 208 and the second user device 208b using near field communications (NFC). In an embodiment, the first user device 208 and the second user device 208b may communicated with an access device 206 through a networked system. In other embodiments, the first user device 208 and the second user device 208b may establish communication with an interconnected system 400 or an access device 206 that is not associated with a networked system in the building 202. This connection may be established with various technologies including GPS, 802.11x (Wi-Fi), cellular, or satellite, by way of non-limiting example. In example embodiments, the first user device 208 and the second user device 208b communicate over multiple independent wired and/or wireless networks. Embodiments are intended to cover a wide variety of types of communication between the first user device 208a, the second user device 208b, the access device 206, and the interconnected systems 400, thus embodiments are not limited to the examples provided in this disclosure.

Referring now to FIG. 2, with continued reference to FIG. 1. FIG. 2 shows a flow chart of method 600 of monitoring a user, in accordance with an embodiment of the disclosure. At block 612, a position request 510 is transmitted from the first user device 208a to the user monitoring system 410. The position request 510 is sent through the application 255a on the first user device 208a. The position request 510 is received from the first user device 208a by the user monitoring system 410. The position request 510 requests visibility to a current position 530 of the second user device 208b.

At block 614, the user monitoring system 410 requests a granularity level 520 of the second user device 208b in relation to the first user device 208a. The granularity level 520 may be a level of detail that the current positions 530 may be seen, as described above. At block 616, if a granularity level 520 has been established already then the method 600 moves onto block 618 but if a granularity level 520 has not been established then the method 600 moves onto block 632.

At block 618, the user monitoring system 410 receives the granularity level 520 that is transmitted from the visibility management system 420. At block 620, the user monitoring system 410 transmits the position request 510 to the positioning system 420. The positioning system 430 is configured to determine a current position 530 of the second user device 208b in response to the position request 510 and transmit the current position 530 to the user management system 410. At block 622, the user management system 410 receives the current position 530. At block 624, the user management system 410 transmits the current position 530 and the granularity level 520 to the mapping system 440 in order to request a mapped position 540. The mapping system 440 is configured to determine a mapped position 540 in response to the current position 530 and the granularity level 520. At block 626, the mapping system 440 transmits the mapped position 540 to the user monitoring system 410 and the user monitoring system 410 receives the mapped position 540. At block 628, the mapped position 540 is transmitted to the first user device 208a. At block 630, the user device 208a displays the mapped position 540.

At block 616, if a granularity level 520 has not been established then the method 600 moves onto block 632. At block 632, a granularity denial 522 is transmitted from the visibility management system 420 to the user monitoring system 410. At block 634, the user monitoring system 410 transmits the position request 510 to the second user device 208b. An alarm 259 may be activated on the second user device 208b when the position request 510 is received. At block 636, the user of the second user device 208b may review the position request 510 and approve/deny through an application 255b on the second user device 208b. If an approval is received from the user of the second user device 208b, then the user of the first user device 208a may be able to view the current position 530 of the second user device 208b at a granularity level 520 one the granularity level 520 is established.

At block 638, the granularity level 520 is established. The granularity level 520 may be established by the user of the second user device 208b. For example, the user of the second user device 208b may only want the user of the first user device 208a to know whether they are in the building 202 or not in the building. Alternatively, the granularity level 520 may be determined in response to a relationship between the first user device 208a and the second user device 208b. For example, if the user of the first user device 208a is the manager of the user of the second user device 208b then the granularity level 520 may be high enough where the user of the of the first user device 208a is allowed to see a mapped position 540 that is equivalent to the current position 530 of second user device 208b.

At block 640, the approval/denial 590 of the position request 510 and the granularity level 520 (if determined by the user of the second user device 208b) is transmitted back to the user monitoring system 410. If the user of the second user device 208b approved the position request 510 then the method 600 moves to block 620. If the user of the second user device 208b denies the position request 510 then a notice of the denial of the position request 510 is transmitted to the first user device 208a at block 642.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a user, the method comprising:
receiving, using a user monitoring system, a position request from a first user device, the position request requesting visibility to a current position of a second user device;
requesting, using the user monitoring system, a granularity level of the second user device in relation to the first user device;
receiving, using the user monitoring system, a granularity denial from a visibility management system if the granularity level has not been established;
transmitting, using the user monitoring system, the position request to the second user device when the granularity denial has been received;
receiving, using the user monitoring system, an approval from the second user device;
establishing the granularity level in the visibility management system;
receiving, using the user monitoring system, the granularity level from the visibility management system when the granularity level is established;
determining, using a positioning system, a current position of the second user device;
determining, using the user monitoring system, a mapped position in response to the granularity level and the current position, wherein the granularity level increases as the breadth of the mapped position decreases; and
transmitting, using the user monitoring system, the mapped position to the first user device.

2. The method of claim 1, further comprising:
activating an alarm on the first user device when the mapped position is received.

3. The method of claim 1, further comprising:
activating an alarm on the second user device when the position request is received.

4. The method of claim 1, wherein establishing further comprises:
receiving the granularity level from the second user device.

5. The method of claim 1, wherein establishing further comprises:
determining the granularity level in response to a relationship between the first user device and the second user device.

6. The method of claim 1, further comprising:
displaying the mapped position on the first user device.

7. A user monitoring system comprising:
a processor; and
a memory comprising computer-executable instructions that, when executed by the processor, cause the processor to perform operations, the operations comprising:
receiving, using a user monitoring system, a position request from a first user device, the position request requesting visibility to a current position of a second user device;
requesting, using the user monitoring system, a granularity level of the second user device in relation to the first user device;
receiving, using the user monitoring system, a granularity denial from a visibility management system if the granularity level has not been established;
transmitting, using the user monitoring system, the position request to the second user device when the granularity denial has been received,
receiving, using the user monitoring system, an approval from the second user device;
establishing the granularity level in the visibility management system;
receiving, using the user monitoring system, the granularity level from the visibility management system when the granularity level is established;
determining, using a positioning system, a current position of the second user device;
determining, using the user monitoring system, a mapped position in response to the granularity level and the current position, wherein the granularity level increases as the breadth of the mapped position decreases; and
transmitting, using the user monitoring system, the mapped position to the first user device.

8. The user monitoring system of claim 7, wherein the operations further comprise:
activating an alarm on the first user device when the mapped position is received.

9. The user monitoring system of claim 7, wherein the operations further comprise:
activating an alarm on the second user device when the position request is received.

10. The user monitoring system of claim 7, wherein the establishing further comprises:
receiving the granularity level from the second user device.

11. The user monitoring system of claim 7, wherein the establishing further comprises:
   determining the granularity in response to a relationship between the first user device and the second user device.

12. The user monitoring system of claim 7, wherein the operations further comprise:
   displaying the mapped position on the first user device.

13. A computer program product tangibly embodied on a non-transitory computer readable storage medium, the computer program product including instructions that, when executed by a processor, cause the processor to perform operations comprising:
   receiving, using a user monitoring system, tom a position request from a first user device, the position request requesting visibility to a current position of a second user device;
   requesting, using the user monitoring system, a granularity level of the second user device in relation to the first user device;
   receiving, using the user monitoring system, a granularity denial from a visibility management system if the granularity level has not been established,
   transmitting, using the user monitoring system, the position request to the second user device when the granularity denial has been received;
   receiving, using the user monitoring system, an approval from the second user device;
   establishing the granularity level in the visibility management system;
   receiving, using the user monitoring system, the granularity level from the visibility management system when the granularity level is established;
   determining, using a positioning system, a current position of the second user device;
   determining, using the user monitoring system, a mapped position in response to the granularity level and the current position, wherein the granularity level increases as the breadth of the mapped position decreases; and
   transmitting, using the user monitoring system, the mapped position to the first user device.

14. The computer program product of claim 13, wherein the operations further comprise:
   activating an alarm on the first user device when the mapped position is received.

15. The computer program product of claim 13, wherein the operations further comprise:
   activating an alarm on the second user device when the position request is received.

16. The computer program product of claim 13, wherein the establishing further comprises:
   receiving the granularity level from the second user device.

17. The computer program product of claim 13, wherein the establishing further comprises:
   determining the granularity level in response to a relationship between the first user device and the second user device.

* * * * *